United States Patent
Shin et al.

(10) Patent No.: US 11,442,029 B2
(45) Date of Patent: Sep. 13, 2022

(54) RADIATION DETECTOR AND RADIOGRAPHY METHOD USING THE SAME

(71) Applicant: DRTECH CORP, Seongnam-Si (KR)

(72) Inventors: Choul Woo Shin, Seongnam-Si (KR); Won Chul Ko, Yongin-Si (KR); Sung Hoon Lim, Yongin-Si (KR); Jin Hyun Choi, Suwon-Si (KR)

(73) Assignee: DRTECH CORP

( * ) Notice: Subject to any disclaimer, the term of this patent is extended or adjusted under 35 U.S.C. 154(b) by 517 days.

(21) Appl. No.: 14/904,078

(22) PCT Filed: Oct. 23, 2015

(86) PCT No.: PCT/KR2015/011287
§ 371 (c)(1),
(2) Date: Jan. 8, 2016

(87) PCT Pub. No.: WO2017/003034
PCT Pub. Date: Jan. 5, 2017

(65) Prior Publication Data
US 2017/0227475 A1    Aug. 10, 2017

(30) Foreign Application Priority Data
Jul. 2, 2015    (KR) .......................... 10-2015-0094645

(51) Int. Cl.
*G01N 23/04*    (2018.01)
*G01T 1/15*    (2006.01)
(Continued)

(52) U.S. Cl.
CPC ............. *G01N 23/04* (2013.01); *G01T 1/026* (2013.01); *G01T 1/15* (2013.01); *G01T 1/247* (2013.01); *H04N 5/32* (2013.01)

(58) Field of Classification Search
CPC ........... G01N 23/04; G01T 1/161; H04N 5/32
(Continued)

(56) References Cited

U.S. PATENT DOCUMENTS 5,894,129 A * 4/1999 Pool ........................ A61B 6/145
250/370.09
6,404,854 B1 * 6/2002 Carroll .................... A61B 6/145
348/E3.02
(Continued)

FOREIGN PATENT DOCUMENTS

| CN | 102481135 A | 5/2012 |
|---|---|---|
| CN | 102934526 A | 2/2013 |

(Continued)

OTHER PUBLICATIONS

International Search Report for PCT/KR2015/011287 dated Mar. 31, 2016.
Written Opinion for PCT/KR2015/011287 dated Mar. 31, 2016.

*Primary Examiner* — David P Porta
*Assistant Examiner* — Carolyn Fin
(74) *Attorney, Agent, or Firm* — Renaissance IP Law Group LLP

(57) ABSTRACT

Provided is a radiation detector including a radiation detecting unit, a gate module controlling a gate line, a readout module reading out charges stored in an exposure detection pixel determined by a data line and the gate line, and an auto exposure detecting unit determining whether the radiation detecting unit is exposed to a radiation.

6 Claims, 2 Drawing Sheets

(51) Int. Cl.
*G01T 1/24* (2006.01)
*G01T 1/02* (2006.01)
*H04N 5/32* (2006.01)

(58) Field of Classification Search
USPC .................. 250/370.07, 370.08, 371, 370.09
See application file for complete search history.

(56) References Cited

U.S. PATENT DOCUMENTS

| | | | | |
|---|---|---|---|---|
| 6,801,598 | B2* | 10/2004 | Tashiro .................... | A61B 6/00 |
| | | | | 250/205 |
| 2013/0343522 | A1 | 12/2013 | Yoon et al. | |
| 2014/0112448 | A1* | 4/2014 | Takenaka ................. | H04N 5/32 |
| | | | | 378/114 |
| 2014/0166859 | A1* | 6/2014 | Mellot ................. | G01J 1/4204 |
| | | | | 250/208.1 |
| 2014/0361189 | A1 | 12/2014 | Kameshima et al. | |
| 2015/0043715 | A1 | 2/2015 | Kuwabara et al. | |
| 2015/0078528 | A1 | 3/2015 | Okada | |

FOREIGN PATENT DOCUMENTS

| | | |
|---|---|---|
| CN | 104665855 A | 6/2015 |
| JP | 2012175988 A | 9/2012 |
| JP | 2013162963 A | 8/2013 |
| JP | 2015080518 A | 4/2015 |
| JP | 2015100711 A | 6/2015 |
| KR | 100394461 B1 | 8/2003 |
| KR | 20050004179 A | 1/2005 |
| KR | 100615362 B1 | 8/2006 |
| KR | 20130057996 A | 6/2013 |
| KR | 20140034018 A | 3/2014 |
| KR | 20150061704 A | 6/2015 |
| WO | 2011008421 A1 | 1/2011 |

* cited by examiner

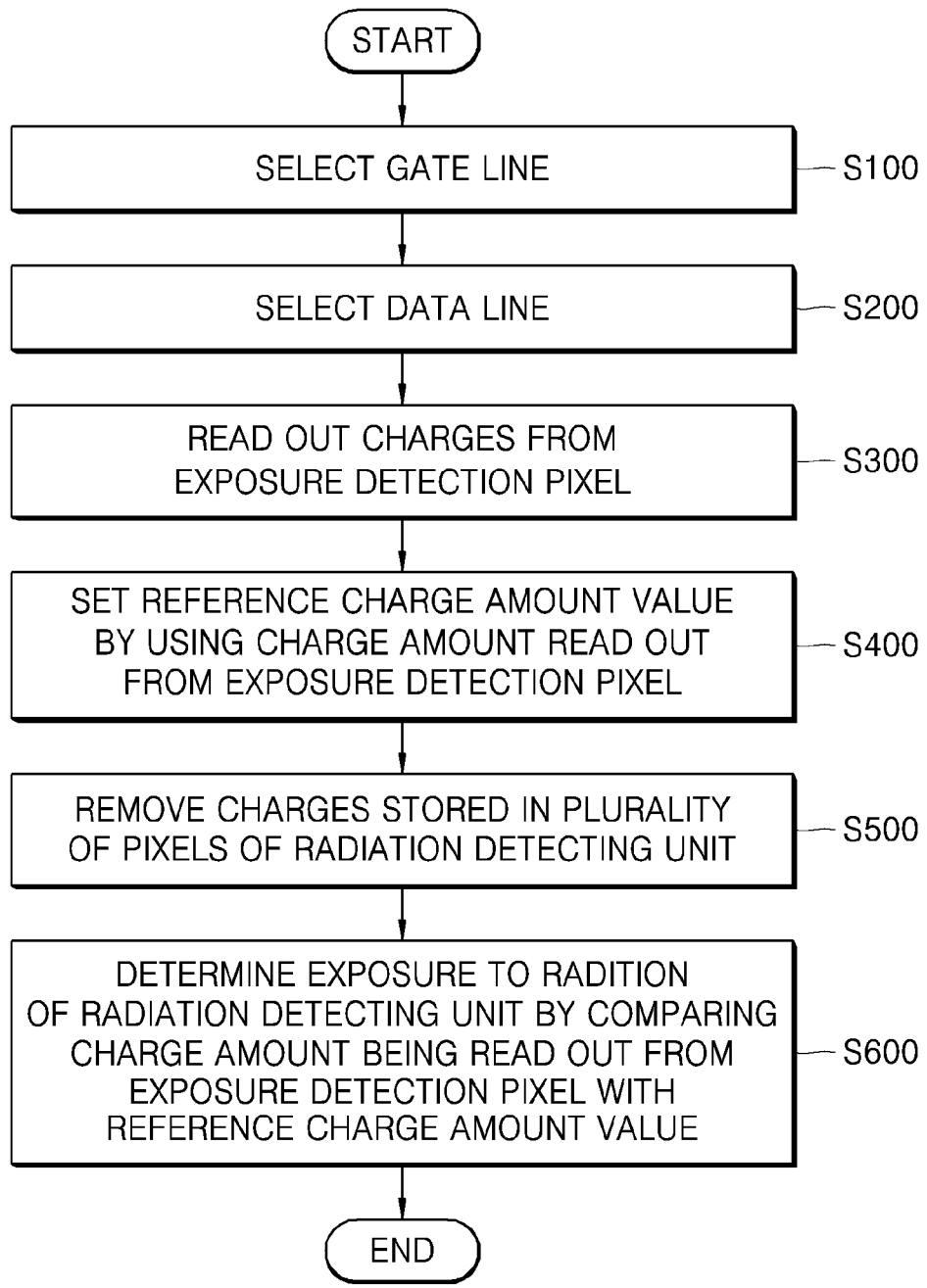

RADIATION DETECTOR AND RADIOGRAPHY METHOD USING THE SAME

TECHNICAL FIELD

The present invention relates to a radiation detector and a radiography method using the same, and in particular, to a radiation n detector and a radiography method using the same having an auto exposure detection (AED) function.

BACKGROUND ART

Typically, a radiography device is configured with a radiation generator for irradiating a radiation on a subject, and a radiation detector for detecting a radiation passing through the subject.

The radiation detector of the radiography device sequentially performs the following operations. Firstly, a reset operation is performed for emptying dark current accumulated on a radiation detecting unit by a line unit. Next, an exposure operation for absorbing a radiation irradiated from the radiation generator is performed. Then, a readout operation is performed for reading out charges generated by the radiation irradiation in the radiation detector At this point, when receiving an exposure request signal from the radiation generator during the reset operation, the radiation detector completes the reset operation in progress across the entire region. Thereafter, an exposure operation is performed by transmitting an exposure preparation signal for indicating that the exposure preparation is completed.

Like this, a trigger method for handshaking state signals between the radiation generator and the radiation detector is called an active line trigger method.

When a radiation generator of the active line trigger method is used, since the radiation detector may complete a reset operation during a time period between a reception time of an exposure request signal and a transmission time of an exposure preparation signal, charge amount data of good quality may be obtained. However, for the case of the active line trigger method, it is disadvantageous in that it is required to add a separate device to the existing radiation detector and a configuration of the radiation detector is complicated.

Furthermore, there are also a passive line trigger method for sending only an exposure request signal to a radiation detector and irradiating a radiation, and a non-line trigger method for not sending the exposure request signal to a radiation detector and irradiating a radiation. When the radiation generators of these methods are used, since it takes time to convert from a reset operation to an exposure operation in a radiation detector, a part of the irradiated radiation is lost and accordingly charge amount data of good quality may not be obtained.

In addition, in order to reduce a loss amount of radiation, there is a case where an exposure operation is performed in a state where a reset operation for lines in a partial region is not completed in the radiation detector. In this case, degradation by a line unit may occur in a radiographic image which is generated by outputting the obtained charge amount data.

Accordingly, in order to address such a limitation, a method is proposed which is capable of obtaining charge amount data of good quality by minimizing a radiation loss in an interface environment where a radiation is irradiated. Such a method is an asynchronous method for detecting a radiation irradiated from a radiation generator to generate an automatic exposure request signal for autonomously notifying the radiation irradiation, which still has a limitation.

CITATION LIST

Patent Literature

Korean Patent No. 10-0394461

DISCLOSURE OF THE INVENTION

Technical Problem

The present invention provides a radiation detector and a radiography method using the same which are capable of performing an auto exposure detection (AED) function without a separate complicated device for the AED.

Technical Solution

According to an embodiment of the present invention, a radiation detector includes: a radiation detecting unit including a plurality of pixels, which are arrayed in a matrix type and are connected to a plurality of gate lines and a plurality of data lines intersecting with each other, and storing charges generated in proportion to irradiation dose of a radiation in the plurality of pixels; a gate module selecting at least one of the plurality of gate lines and controlling the selected gate line; a readout module selecting at least one of the plurality of data lines and reading out charges stored in at least one exposure detection pixel determined by the selected data line and the selected gate line; and an auto exposure detecting unit determining whether the radiation detecting unit is exposed to the radiation by using a charge amount that the readout module reads out from the exposure detection pixel.

The auto exposure detecting unit may include: a reference setting unit setting a reference charge amount value by using a charge amount that the readout module has read out from the exposure detection pixel at a time of non-exposure to radiation of the radiation detecting unit; a comparison determining unit comparing the reference charge amount value with the charge amount being read out from the exposure detection pixel to determine whether the radiation detecting unit is exposed to the radiation; and a signal generating unit generating a selective control signal according to whether the radiation detecting unit is exposed to the radiation.

The comparison determining unit may determine exposure to radiation of the radiation detecting unit when the charge amount being read out from the exposure detection pixel is equal to or greater than the reference charge amount value, and the signal generating unit may generate a scan request signal for scanning the plurality of pixels to read out image outputting charges when the exposure to radiation of the radiation detecting unit is determined.

The comparison determining unit may determine the non-exposure to radiation of the radiation detecting unit when the charge amount being read out from the exposure detection pixel is smaller than the reference charge amount value, and the signal generating unit may generate a reset request signal for removing the charges stored in the plurality of pixels of the radiation detecting unit when the non-exposure to radiation of the radiation detecting unit is determined.

The radiation detector may further include a control unit receiving the control signal and controlling the gate module and the readout module.

The gate module may include a line shift unit allowing the plurality of gate lines to be sequentially selected, and after the charges from the exposure detection pixel are read out, the line shift unit may be initialized to allow the selected gate line to be reselected.

According to another embodiment of the present invention, a radiography method uses a radiation detector which includes a radiation detecting unit including a plurality of pixels, which are arrayed in a matrix type and are connected to a plurality of gate lines and a plurality of data lines intersecting with each other, and storing charges generated in proportion to irradiation dose of radiation in the plurality of pixels. The radiography method includes: (a) selecting at lease one of the plurality of gate lines; (b) selecting at lease one of the plurality of data lines; (c) reading out charges from at least one exposure detection pixel determined by the selected gate line and the selected data line at a time of non-exposure to radiation of the radiation detecting unit; (d) setting a reference charge amount value by using a charge amount of the charges read out from the exposure detection pixel; (e) removing the charges stored in the plurality of pixels of the radiation detecting unit; and (f) reading out charges from the exposure detection pixel, and comparing a charge amount of the charges being read out from the exposure detection pixel with the reference charge amount value to determine whether the radiation detecting unit is exposed to radiation.

The radiography method may further include: setting an exposure time for which the radiation detecting unit is exposed to radiation.

In the determining whether the radiation detecting unit is exposed to radiation, when the charge amount being read out from the exposure detection pixel is smaller than the reference charge amount value, non-exposure to radiation of the radiation detecting unit may be determined and operations (e) and (f) are re-performed.

The exposure time may be longer than a period in which operations (e) and (f) are re-performed.

In the determining whether the radiation detecting unit is exposed to radiation, when the charge amount being read out from the exposure detection pixel is equal to or greater than the reference charge amount value, the radiography method may further include: determining the exposure to radiation of the radiation detecting unit and maintaining the exposure to radiation of the radiation detecting unit during the exposure time; and reading out image outputting charges by scanning the plurality of pixels.

The radiography method may further include correcting charge amount data of the exposure detection pixel.

In the correcting of the charge amount data, charge amount data of pixels adjacent to the exposure detection pixel may be interpolated to correct the charge amount data of the exposure detection pixel.

Advantageous Effects

A radiation detector according to an embodiment of the present invention may perform an auto exposure detection (AED) function without a separate complicated device for detecting radiation exposure. To this end, the radiation detector according to the present invention simply performs the AED function by configuring an AED module with an internal logic in an integrated circuit (e.g. field-programmable gate array). The integrated circuit used in the present invention is necessarily used for controlling a gate module and a readout module. In addition, the AED function may be performed with only one exposure detection pixel by using at least one exposure detection pixel selected from among a plurality of pixels of a radiation detecting unit. Accordingly, an AED speed may become rapid, and a charge amount lost in an AED process may also be reduced.

Furthermore, the radiation detector of the present invention does not reset the radiation detecting unit after detecting radiation exposure but uses the entire radiation irradiated during a designated radiation exposure time period in a case where the radiation is detected with the radiation detecting unit. Accordingly, the irradiated radiation may be effectively used, and since radiography is performed during the designated radiation exposure time period, a radiography time may be reduced. In addition, since a subject is exposed to a radiation only for a set exposure time period due to an effective use of radiation, an exposure radiation dose of a subject may be minimized. In other words, by using the entire set exposure time period with an efficient use of radiation, subject's unnecessary exposure to radiation may be reduced and degradation in image quality may be effectively prevented. In other words, radiography is enabled without loss of radiation.

In addition, since the AED module is not a separate device including a separate optical detection member or a radiation detection member, a detection error due to vibration may be reduced.

BRIEF DESCRIPTION OF THE DRAWINGS

FIG. 3 is a flowchart illustrating a radiography method according to another embodiment of the present invention.

MODE FOR CARRYING OUT THE INVENTION

Figure 1:
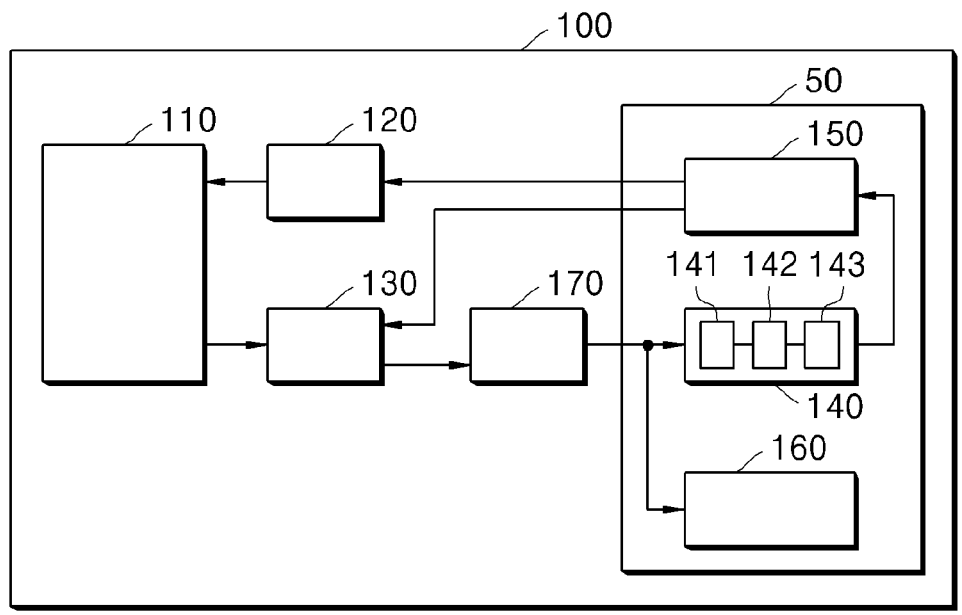
FIG. 1 is a block diagram illustrating a configuration of a radiation detector according to an embodiment of the present invention.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the drawings and written description, like reference numerals refer to like elements. In the drawings, the dimensions may be partially enlarged or exaggerated for clarity of illustration.

Figure 2:
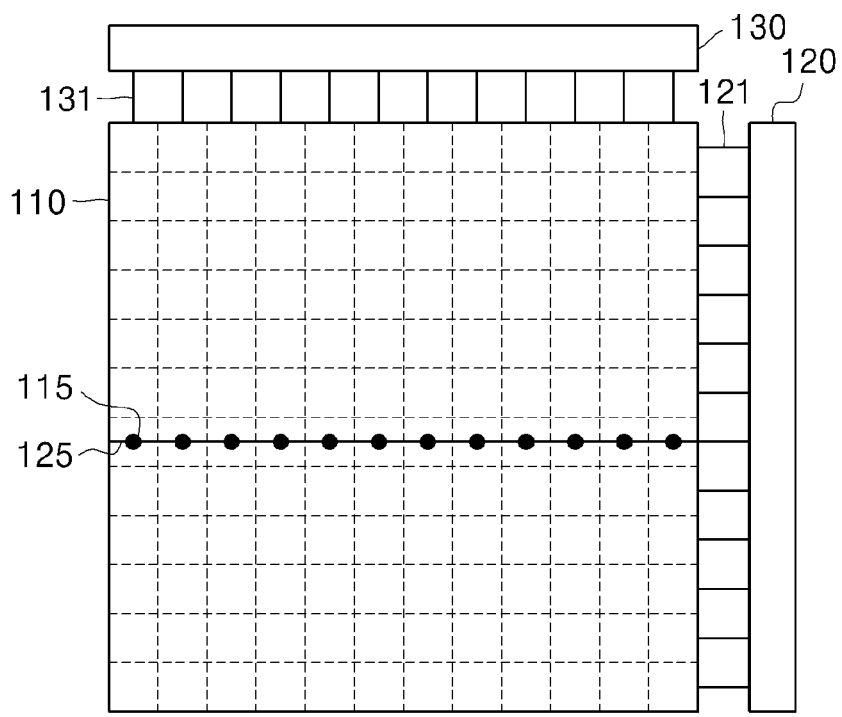
FIG. 2 is a conceptual diagram for explaining an exposure detection pixel according to an embodiment of the present invention.

FIG. 1 is a block diagram illustrating a configuration of a radiation detector according to an embodiment of the present invention, and FIG. 2 is a conceptual diagram for explaining an exposure detection pixel according to an embodiment of the present invention.

Referring to FIGS. 1 and 2, a radiation detector 100 according to an embodiment of the present invention may include a radiation detecting unit 110 which includes a plurality of pixels arrayed in a matrix type and connected to a plurality of gate lines 121 and a plurality of data lines 131, which intersect with each other, and which stores, in the plurality of pixels, charges generated in proportion to an irradiation dose of a radiation; a gate module 120 for selecting at least one of the plurality of gate lines 121 and controlling the selected gate line 125; a readout module 130 for selecting at least one of the plurality of data lines 131 and reading out the charges stored in at least one exposure detection pixel 115, which is determined by the selected data line and the selected gate line 125; and an auto exposure detecting unit 140 for determining whether the radiation detecting unit 110 is exposed to the radiation by using the charge amount read out by the readout module 130 from the exposure detection pixel 115.

The radiation detecting unit 110 is irradiated with the radiation, and charges may be generated therein by the irradiated radiation. The radiation detecting unit 110 may be divided by the plurality of pixels arrayed in the matrix type, and the generated charges may be stored in each pixel in proportion to an irradiation dose of radiation. The radiation detector 100 may be a direct type for directly generating charges by using a material (e.g. a photoconductive material, etc.) for generating charges when a radiation is irradiated thereon, or a indirect type for indirectly generating charges through a photodiode by converting an irradiated radiation to visible light by using a material (e.g. scintillator, etc.) for converting the radiation into visible light. For the indirect type, the radiation detecting unit 110 may include a scintillator for receiving a radiation irradiated on each pixel and emitting light and outputting a visible light photon, a optical diode (or photodiode) for receiving the output visible light photon to generate a charge (or an electrical signal), and a storage element (e.g. a storage capacitor) for storing the generated charge. Furthermore, an optical diode capable of storing a charge may also be used.

The gate module 120 may select at least one gate line from among the plurality of gate lines 121 and control the selected gate line. For example, when the gate line is selected in the gate module 120, storage elements (e.g. a pixel electrode, a storage capacitor, etc.) connected to the selected gate line may be turned On, and when the storage elements connected to the selected gate line are turned On, the charges accumulated in the storage elements may move through the data line 131.

In the present invention, for an auto exposure detection (AED) function, at least one gate line 125 for detecting radiation exposure may be selected from among the plurality of gate lines 121. When the gate line 125 to detect the radiation exposure is selected, the radiation detector 100 may detect radiation exposure by scanning only the selected gate line 125 to read out a charge amount until the radiation exposure is detected. Furthermore, as the gate line 125 for detecting the radiation exposure, a gate line 121 near a central portion on which the radiation is typically mainly irradiated may also be selected. However, the selection is not limited thereto and may be performed in a desired position (e.g. a top or bottom portion) or a plurality of gate lines (e.g. three gate lines respectively in the top, center, and bottom portions) may be selected.

The readout module 130 may select at least one data line from among the plurality of data lines 131, and read out charges stored in a pixel determined by the selected data line and the gate line selected by the gate module 120 (or in a pixel corresponding to a point at which the selected data line and the gate line selected by the gate module 120 intersect with each other). For example, when the storage element is turned On and the charges stored therein move through the data line 131, the readout module 130 may select the data line through which the charges move and may read out the charges therefrom. At this point, the readout module 130 may also convert the read-out charges to an electrical signal.

In the present invention, at least one data line, which intersects with the gate line 125 selected for detecting the radiation, is selected from among the plurality of data lines 131, and charges stored in the at least one exposure detection pixel 115, which is determined by the at least one selected data line and the gate line 125 selected for detecting the radiation exposure, are read out. At this point, only one exposure detection pixel may be used, but a plurality of exposure detection pixels may be used for stably detecting the radiation exposure. Through this, the charges are read out only from the exposure detection pixel 115 to simply perform the AED function.

Furthermore, the plurality of gate lines 121 and the plurality of data lines 131 may be grouped to be connectable to an integrated circuit (IC), and each IC may include a plurality of channels respectively connected to a plurality of lines. For example, the radiation detector 100 may include 12 gate ICs and 12 readout ICs (total 24 ICs) respectively in horizontal and vertical directions, and each IC may have 256 channels. In this case, the radiation detecting unit 110 may be divided into 3072×3072 pixels, and 12 exposure detection pixels 115 may be used with 12 data lines 131 respectively selected by the ICs. Here, the width of each pixel may be about 140 μm and the range of a pixel value (e.g. a charge amount stored in the pixel) may be about 0 to about 16,384 (i.e. a 14 bit value). In addition, when each IC selects one data line 131, each IC may select a data line 131 corresponding to the same channel, and when failure in radiation exposure detection occurs in any one exposure detection pixel 115, rapid movement to the next exposure detection pixel 115 may be performed. In addition, it is easy to determine a position of each exposure detection pixel 115, and when the position of each exposure detection pixel 115 is determined, a radiation exposure detection speed may increase and charge amount data lost due to the radiation exposure detection may be easily corrected. Furthermore, it is not always necessary to select 12 exposure detection pixels 115, and it is sufficient to select at least one exposure detection pixel. In addition, since the AED operation is not limited by the exposure detection pixel, an overall mean or the desired number of exposure detection pixels may be changed.

The auto exposure detecting unit 140 may determine whether the radiation detecting unit 110 is exposed to a radiation by using a charge amount that the readout module 130 reads out from the exposure detection pixel 115. For example, a reference charge amount value is set as the charge amount read out by the readout module 130 at the time of non-exposure of the radiation detecting unit 110 (or at an early time of auto exposure detection), and when the reference charge amount value and a charge amount being read out (or a currently read out charge amount) are compared and the charge amount being read out is equal to or greater than the reference charge amount value, it may be determined that the radiation detection unit 110 is exposed to the radiation.

The auto exposure detecting unit 140 may include a reference setting unit 141 for setting the reference charge amount value using the charge amount read out from the exposure detection pixel 115 by the readout module 130 when the radiation detecting unit 110 is not exposed to the radiation; a comparison determining unit 142 for comparing the reference charge amount value and a charge amount at present in the exposure detection pixel 115 to determine whether the radiation detecting unit 110 is exposed to the radiation; and a signal generating unit 143 for scanning a plurality of pixels of the radiation detecting unit 110, when the radiation detecting unit 110 is exposed to the radiation, and for generating a scan signal for reading out the charge amount for an image output from the plurality of pixels of the radiation detecting unit 110.

The reference setting unit 141 may set the reference charge amount value by using the charge amount read out from the at least one exposure detection pixel 115, when the radiation detecting unit 110 is not exposed to the radiation. The charge amount read out from the at least one exposure detection pixel 115 at the time of non-exposure to radiation may be dark current accumulated in each exposure detection pixel 115 and the reference charge amount value may be selected greater than the charge amount read out from the at least one exposure detection pixel 115. Here, the reference charge amount value may be selected greater by a predetermined ratio than the charge amount, which is read out from the at least one exposure detection pixel 115 at the time of non-exposure to radiation, in order to reduce a radiation exposure detection error. The predetermined ratio may be properly determined according to the specification of the radiation detector and a radiography environment, etc. For example, when the charge amount read out from the exposure detection pixel 115 is 10 at the time of non-exposure to radiation, the reference charge amount value may be about 50. At this point, in order to avoid a detection error due to vibration, even when the vibration error occurs, a charge amount readable from the exposure detection pixel 115 at the time of exposure to radiation should equal to or greater than 50, and a charge amount readable from the exposure detection pixel 115 at the time of non-exposure to radiation should be smaller than 50, even when the vibration error occurs.

Furthermore, a typical radiation detector frequently rubs or contacts a patient for movement or examination. In this case, while a state of a photo detecting unit or radiation detecting unit is changed by vibration occurring due to the rub or the contact, an undesired auto exposure request signal is generated. However, in the present invention, since the reference charge amount value is set by reflecting the vibration error, the error in radiation exposure detection may be reduced.

The comparison determining unit 142 may determine whether the radiation detecting unit 110 is exposed to a radiation by comparing the reference charge amount value and a charge amount currently read out from the exposure detection pixel 115. When the charge amount currently read out from the exposure detection pixel 115 is equal to or greater than the reference charge amount value, the radiation detection unit 110 may be determined to be exposed to radiation. The charge amount stored in the exposure detection pixel 115 is proportional to the irradiation dose of radiation. Accordingly, when the radiation detecting unit 110 is not exposed to radiation and then is abruptly exposed to radiation, the charge amount currently read out from the exposure detection pixel 115 becomes greater to be equal to or greater than the reference charge amount value. Using this, the exposure to radiation of the radiation detecting unit 110 may be determined.

When the exposure detection pixel 115 is in plural numbers, the comparison determining unit 142 may determine the exposure to radiation of the radiation detecting unit 110 in a case where the charge amount currently read out from the plurality of exposure detection pixels 115 is equal to or greater than the reference charge amount value in the at least one exposure detection pixel 115 regardless of positions among the plurality of exposure detection pixels 115. At this point, when exposure to radiation of the radiation detecting unit 110 is determined in a case where the charge amount is equal to greater than the reference charge amount value in two or more exposure detection pixels 115, whether the radiation detecting unit 110 is exposed to radiation may be more accurately determined. For example, even when a failure or fault occurs in one exposure detection pixel 115, since detection (or determination) for another exposure detection pixel 115 may be used, a detection error due to the failure or fault of the one exposure detection pixel 115 may be prevented. Furthermore, at the time of exposure to radiation, the radiation may be irradiated on almost all pixels of the radiation detecting unit 110. Accordingly, at the time of exposure to radiation, since two or more exposure detection pixels 115 may be irradiated at all times, when the radiation is detected from two or more exposure detection pixels 115, there is no problem to determine the exposure to radiation of the radiation detecting unit 110. In addition, at the time of exposure to radiation, since the central portion of the radiation detecting unit 110 is a portion on which the radiation is typically mainly irradiated, the entirety of or at least one of the exposure detection pixels 115 may be positioned on the central portion of the radiation detecting unit 110.

On the other hand, the comparison determining unit 142 may determine whether the radiation detecting unit 110 is exposed to a radiation when the charge amount currently read out from the exposure detection pixel 115 is smaller than the reference charge amount value. The charge amount stored in the exposure detection pixel 115 is proportional to the irradiation dose of radiation. Accordingly, when the radiation detecting unit 110 is not continuously exposed to radiation, the charge amount currently read out from the exposure detection pixel 115 continuously has a similar value and the charge amount currently read out from the exposure detection pixel 115 becomes smaller than the reference charge amount value, which is greater than the charge amount read out from the exposure detection pixel 115 at the time of non-exposure to radiation. Using this, the non-exposure to radiation of the radiation detecting unit 110 may be determined.

The signal generating unit 143 may generate a control signal including a scan request signal and a reset request signal according to the determination of exposure to radiation of the radiation detecting unit 110. When determining the exposure of radiation of the radiation detecting unit 110, the signal generating unit 143 may scan the plurality of pixels of the radiation detecting unit 110 to generate the scan request signal for reading out image outputting charges from the plurality of pixels of the radiation detecting unit 110. A method for scanning the plurality of pixels of the radiation detecting unit 110 may be a progressive scan for progressively scanning from a left topmost end to a right bottommost end. To this end, a line shift unit (not shown) such as a shift register may be used and the image outputting charges may be used for generating a radiographic image. Furthermore, a time for scanning one gate line 121 may be very short. For example, it may be about 196 μs. When the time for scanning the one gate line 121 is about 196 μs, and the radiation detecting unit 110, for which the exposure to radiation has been determined, is exposed to radiation for a set exposure time (e.g. 500 ms), the exposure detection pixel 115 or the gate line 125 selected for detecting the radiation loses a radiation irradiation dose irradiated for about 196 μs due to comparison of the reference charge amount value with the charge amount of the exposure detection pixel 115 at present. A detailed description about the shift register will be provided later.

On the other hand, when the non-exposure to radiation of the radiation detecting unit 110 is determined, the signal generating unit 143 may generate a reset request signal for removing all the charges stored in the plurality of pixels of the radiation detecting unit 110. The charge amount read out from the at least one exposure detection pixel 115 at the time of non-exposure to radiation of the radiation detecting unit 110 may be dark current. Since the dark current may be accumulated in all the plurality of pixels of the radiation detecting unit 110, the charges stored in the plurality pixels of the radiation detecting unit 110 may be all removed before exposure to radiation of the radiation detecting unit 110 for accurate determination of the exposure to radiation of the radiation detecting unit 110 and for a radiographic image of high quality. Here, when the non-exposure to radiation of the radiation detecting unit 110 is determined, the signal generating unit 143 may generate the reset request signal for removing all the charges stored in the plurality of pixels of the radiation detecting unit 110.

The gate module 120 may include a line shift unit (not illustrated) such as a shift register for enabling the plurality of gate lines to be sequentially selected. Furthermore, the readout module 130 may include a line shift unit (not illustrated) for enabling the plurality of data lines to be sequentially selected. The shift register is a processor register set installed in a linear manner in a digital circuit, and may connect an input and an output to each other in a manner for moving data to a next line when the circuit is activated. In the present invention, the plurality of pixels or the plurality of exposure detection pixels 115 of the radiation detecting unit 110 may be progressively scanned through the shift register.

In addition, after the charges are read out from the plurality of exposure detection pixels 115, the line shift unit (not illustrated) is initialized to enable the selected gate line 125 to be selected again. In order for the selected gate line 125 to be repetitively selected for continuous detection of radiation until before the exposure to radiation of the radiation detecting unit 110 is determined, the initialization may be performed every time the scan of the selected gate line 125 is completed where the scan is performed for determining the exposure to radiation of the radiation detecting unit 110. Here, the initialization of the line shift unit (not illustrated) has a meaning of enabling a first left exposure detection pixel 115 to be selected after the scan of the gate line 125 selected for detecting radiation is completed in order to perform a re-scan from the first left exposure detection pixel 115. This is for enabling the radiation exposure detection to be repetitively performed in the selected gate line 125 by identically selecting the selected gate line 125 without moving to another gate line 121 from the selected gate line 125. In this case, a scan speed for repetitively scanning the selected gate line 125 is rapid, and it may become easy to correct charge amount data lost due to the radiation exposure detection. Furthermore, when the line shift unit (not illustrated) is not initialized, a gate line next to the selected gate line 125 is selected after a scan of the gate line 125 selected for detecting the radiation. At this point, selection is performed from a first left pixel from among pixels of the next gate line. In addition, when the radiation exposure of the radiation detecting unit 110 is determined, the line shift unit (not illustrated) is initialized to enable a left topmost pixel to be selected from among the plurality of pixels of the radiation detecting unit 110. Here, in a case of not being initialized, two or more gate lines 121 are turned On and an abnormal image may be obtained.

The auto exposure detecting unit 140 may be an internal logic of a main control unit 50. The main control unit 50 may include a field programmable gate array (FPGA) and a logic in which a function that the FPGA performs is programmed. Here, the FPGA is a kind of programmable non-memory semiconductor, and a circuit for a use may be carved out for FPGA implementation, unlike the general semiconductor in which a circuit is unchangeable. Accordingly, like a software program for an AED function, a logic is configured for the AED function to enable the semiconductor to easily have the AED function. Accordingly, an AED module is configured with an internal logic in the FPGA to simply perform the AED function without a separate complicated AED device. In other words, the auto exposure detecting unit 140 is included in the main control unit 50, which is an FPGA.

Furthermore, in a typical asynchronous type radiation detector for generating an auto exposure request signal, an amplification circuit may be provided in the circuit for generating the auto exposure request signal so that the auto exposure request signal is generated even when a low level signal is detected in a photo detecting unit or a radiation detecting unit. In this case, a noise signal such as an impulse is amplified to generate an undesired auto exposure request signal. In addition, since a separate complicated device is necessary for detecting exposure to radiation, when an offset is changed according to changed states of elements, which configure a circuit for generating a trigger signal by an abrupt temperature change in an environment in which the radiation detector is used, an undesired auto exposure request signal may be generated. However, in the present invention, since the auto exposure detecting unit 140 is included in the main control unit 50, which is an FPGA, occurrence of a radiation exposure detection error due to a noise signal such as vibration or an impulse may be reduced without a separate complicated device for detecting the exposure to radiation.

The radiation detector 100 may further include a control unit 150 for receiving the control signal to control the gate module 120 and the readout module 130. The control unit 150 is responsible for the entire control of the radiation detector 100. When the scan request signal and the reset request signal are transmitted from the auto exposure detecting unit 140 to the control unit 150, the gate module 120 and the readout module 130 may be controlled to perform a scan function corresponding to the scan request signal and a reset function corresponding to the reset request signal. Furthermore, the control unit 150 may be included in the main control unit 50.

The main control unit 50 may further include a data interface 160. The data interface 160 may play a role for obtaining image outputting charges, for which the gate module 120 and the readout module 130 read out through scanning after the exposure to radiation of the radiation detecting unit 110 is determined, and for arranging image outputting charge data in a frame type to transmit to a PC. Here, analog data is converted to digital data to be delivered to the data interface 160. In this case, the radiation detector 100 may further include an analog-to-digital converter 170 for converting the analog data to the digital data.

Typically, when auto exposure request signal is transmitted to the control unit of the radiation detector, the exposure to radiation is determined by generating the auto exposure request signal by using a separate complicated AED device. When the exposure to radiation is determined, after a reset operation is performed for emptying the dark current accumulated in the radiation detecting unit by a line unit, an exposure operation for absorbing radiation is performed during a predetermined time period. In this case, since a subject is exposed to radiation during the reset operation, a radiation exposure dose of the subject increases and the radiation is lost during the reset operation.

Accordingly, in the present invention, instead of using a separate complicated AED device, an AED module, which is an internal logic, is configured in a typically used IC (e.g. FPGA) to simply perform the AED function without the separate complicated AED device. In addition, in the present invention, an exposure operation for absorbing radiation may be performed during a predetermined time period right after performing a reset operation before detecting the exposure to radiation and detecting the exposure to radiation. Then the radiation may be effectively used without a radiation loss, and accordingly the radiation exposure dose of a subject may be minimized since there is not unnecessary radiation exposure of the subject.

Like this, the radiation detector 100 according to an embodiment of the present invention may simply perform an AED function by configuring, as an internal logic, an AED module in an IC (e.g. FPGA), which is necessarily used for controlling the gate module and the readout module, without a separate complicated device for detecting an incident radiation to detect the exposure to radiation. In addition, the AED function may be performed with only one exposure detection pixel that is selected from among a plurality of pixels of a radiation detecting unit. Accordingly, an AED speed may become rapid, and a charge amount lost in an AED process may also be reduced. In addition, since the AED module is not a separate device including a separate optical detection member or a radiation detection member, a detection error due to vibration, which occurs by a rub or contact, may be reduced. In addition, since a subject is exposed to a radiation only for a set exposure time period due to an effective use of radiation, an exposure radiation dose of the subject may be minimized. Furthermore, the radiation exposure detection error, such as vibration, temperature change, or noise, may be reduced by properly setting the reference charge amount value greater by a predetermined ratio than the charge amount read out from the exposure detection pixel 115 at the time of non-exposure to radiation according to the specification and a radiography environment of the radiation detector 100.

FIG. 3 is a flowchart illustrating a radiography method according to another embodiment of the present invention.

Descriptions will be provided about a radiography method according to another embodiment with reference to FIG. 3, and repetitive descriptions with the foregoing descriptions related to the radiation detector according to the embodiment will be omitted.

A radiography method according to another embodiment of the present invention uses a radiation detector, which includes a plurality of pixels arrayed in a matrix type and connected to a plurality of gate lines and a plurality of data lines, which intersect with each other, and a radiation detecting unit for storing charges generated in proportion to an irradiation dose of radiation in the plurality of pixels. The radiography method includes: (a) an operation S100 for selecting at least one gate line from among the plurality of gate lines; (b) an operation S200 for selecting at least one data line from among the plurality of data lines; (c) an operation S300 for reading out charges from at least one exposure detection pixel, which is determined by the selected gate line and the selected data line when the radiation detecting unit is not exposed to radiation; (d) an operation S400 for setting a reference charge amount value by using a charge amount of the charges read out from the exposure detection pixel; (e) an operation S500 for removing the charges stored in the plurality of pixels of the radiation detecting unit; and (f) an operation S600 for reading out charges from the exposure detection pixel, and comparing a charge amount of the charges being read out from the exposure detection pixel with the reference charge amount value to determine whether the radiation detecting unit is exposed to a radiation.

Firstly, at least one gate line to detect radiation is selected from among the plurality of gate lines (operation S100). When the gate line to detect the radiation is selected, the radiation detector may detect exposure to radiation by scanning (or reading out) only the gate line selected for detecting the radiation to read out charges until the radiation exposure is detected. Accordingly, the AED function may be simply performed without a separate complicated AED device which is necessary in related art.

Next, at least one data line, which intersects with the gate line selected for detecting the radiation, is selected from among the plurality of data lines (operation S200). At this point, a data line positioned at the central portion of the radiation detecting unit, which is a portion on which radiation is typically mainly irradiated at the exposure to radiation, may be selected.

Then, charges are read out from at least one exposure detection pixel at which the at least one selected gate line and the at least one data line are intersected at the time of non-exposure to radiation (or an early time of auto exposure detection) of the radiation detecting unit (operation S300). In this case, the AED function may be simply performed by reading out the charges only from the exposure detection pixel. Furthermore, when the plurality of pixels of the radiation detecting unit are grouped into 12 groups, 12 data lines may be respectively selected from the 12 groups, and 12 exposure detection pixels may be used.

In addition, the reference charge amount value is set by using the charges read out from the at least one exposure detection pixel (operation S400). The charge amount read out from the exposure detection pixel is a charge amount read out at the time of non-exposure to radiation of the radiation detecting unit or at the early auto exposure detection time. A proper reference charge amount value may be set by comparing the charge amount read out from the exposure detection pixel with a charge amount readable at the time of the non-exposure to radiation of the radiation detecting unit. Furthermore, the charge amount read out from the exposure detection pixel at the time of the non-exposure to radiation may be dark current accumulated in each exposure detection pixel, and the reference charge amount value may be selected greater than the charge amount read out from the exposure detection pixel. Here, the reference charge amount value may be selected greater by a predetermined ratio than the charge amount, which is read out from the at least one exposure detection pixel at the time of non-exposure to the radiation, in order to reduce a radiation exposure detection error. The predetermined ratio may be properly determined according to the specification of the radiation detector and a radiography environment, etc.

Thereafter, the charges stored in the plurality of pixels of the radiation detecting unit are all removed (operation S500). The charge amount read out from the exposure detection pixel at the time of non-exposure to radiation of the radiation detecting unit may be dark current. In addition, since the dark current may be accumulated in all the plurality of pixels of the radiation detecting unit, the charges stored in the plurality pixels of the radiation detecting unit may be all removed before exposure to radiation of the radiation detecting unit for accurate determination of the exposure to radiation of the radiation detecting unit and for a radiographic image of high quality.

Next, the charges are being read out from the at least one exposure detection pixel, and a charge amount of the charges being read out is compared with the reference charge amount value to determine whether the radiation detecting unit is exposed to radiation (operation S600). When the charge amount being read out (or currently read out) is equal to or greater than the reference charge amount value, the exposure to radiation of the radiation detecting unit may be determined. When the charge amount being read out is smaller the reference charge amount value, it may be determined that the radiation detecting unit is not exposed to the radiation. At this point, when the charge amount being read out in the operation S600 for determining of the exposure to radiation is smaller than the reference charge amount value, it may be determined that the radiation detecting unit is exposed to the radiation and operations (e) and (f) may be re-performed. Through this, the AED function may be simply performed by repeating operations (e) and (f) until the exposure to radiation of the radiation detecting unit is determined.

An operation for setting an exposure time, while the radiation detecting unit is exposed to radiation, may be further included. When the exposure time is set, since a proper radiation is enabled to be irradiated on a subject after the exposure to radiation of the radiation detecting unit is detected, a radiation exposure dose of the subject may be reduced and the irradiation dose of radiation may be simply controlled without a complicated configuration. Furthermore, the exposure time may vary according to the radiation intensity, and the exposure time and radiation intensity may be properly determined.

In operation S600 for determining the exposure to radiation, when the charge amount being read out is equal to or greater than the reference charge amount value, it may be determined that the radiation detecting unit is exposed to radiation, and an operation for maintaining the exposure to radiation of the radiation detecting unit; and an operation for reading out image outputting charges by scanning the plurality of pixels may be further included.

In the operation for maintaining the exposure to radiation of the radiation detecting unit, the radiation detecting unit is exposed to radiation during the exposure time in order to generate a radiographic image. In the present invention, after the exposure to radiation of the radiation detecting unit is determined, the radiation detecting unit is not reset and the exposure to radiation thereof may be maintained. In this case, after the exposure to radiation of the radiation detecting unit is determined, since the irradiated radiation may be used in succession, the irradiated radiation may be effectively used and a radiography time may be reduced. In addition, since a subject may be exposed to a radiation only for a set exposure time period due to an effective use of radiation, an exposure radiation dose of the subject may be minimized.

In the operation for reading out image outputting charges, the image outputting charges are read out from the plurality of pixels of the radiation detecting unit by scanning the plurality of pixels of the radiation detecting unit. A method for scanning the plurality of pixels of the radiation detecting unit may be a progressive scan for progressively scanning from a left topmost end to a right bottommost end. To this end, a shift register may be used and the image outputting charges may be used for generating a radiographic image. Furthermore, a description about the shift register is provided in the description about the radiation detector according to an embodiment of the present invention, and will be omitted here. In the operation for reading out image outputting charges, after the exposure to radiation of the radiation detecting unit is determined, the exposure to radiation of the radiation detecting unit may be maintained without being reset and the image outputting charges may be instantly read out. Accordingly, the irradiated radiation may be effectively used without a loss and the radiography time may be reduced.

Furthermore, after the image outputting charges are read out from the plurality of pixels of the radiation detecting unit and are transmitted to a PC for generating a radiographic image, the radiation detecting unit may be reset (or charges remaining in the plurality of pixels of the radiation detecting unit may be removed) for a predetermined time (e.g. 7 seconds). In addition, after the first radiography, the AED function is performed by repeating operations (e) and (f) in a certain interval (e.g. about 100 ms to 500 ms) without setting the reference charge amount value, and rapid re-radiography may be performed. A predetermined time for resetting the radiation detecting unit may vary according to the set exposure time and radiation intensity. Here, when the exposure to radiation is performed for a long time (e.g. about 500 ms or longer) or exposure to radiation of high intensity is performed, the charges stored in the plurality of pixels of the radiation detecting unit due to generation of a radiographic image do not all disappear but remain therein. Due to the remaining charges, a ghost image or an afterimage may exist at the time of next radiography. Accordingly, the charges remaining in the plurality of pixels of the radiation detecting unit may be completely removed by repeating to reset the radiation detecting unit or making a reset time longer. At this point, since the charges remain in proportion to the exposure time and the radiation intensity, when the set exposure time becomes longer or the radiation intensity becomes higher, the predetermined time may becomes longer. Due to this, the number of reset times or a rest time of the radiation detecting unit may become longer.

Furthermore, a typical radiation detector may secure a preparation time for re-radiography to obtain charge amount data of good quality at the time of next radiography. Accordingly, in a radiation detector of the active line trigger method secures a predetermined re-radiography preparation time. In addition, for a case of using the radiation detector of the non-line trigger method, there is a problem in that the radiation may be irradiated regardless of a state of the radiation detector. In other words, in a typical radiation detector, since irradiation for the next radiography is performed in a very short time in a state where the radiation detecting unit is not yet stabilized, cases may occur where the radiation detector does not generate a valid auto exposure request signal, or charge amount data of good quality may not be obtained. However, in the present invention, after the first radiography, the AED function is performed by repeating operations (e) and (f) in a certain interval (e.g. about 100 ms to 500 ms) without setting the reference charge amount value. Accordingly, re-radiography may be rapidly and stably performed.

In the operation S600 for determining the exposure to radiation, when the exposure detection pixels are present in plural numbers, the exposure to radiation of the radiation detecting unit may be determined in a case where the charge amount being read out is equal to or greater than the reference charge amount value in at least two of the plurality of exposure detection pixels. In this case, the exposure to radiation of the radiation detecting unit may be more accurately determined. For example, even when a failure or fault occurs in one exposure detection pixel 115, since detection (or determination) for another exposure detection pixel may be used, a detection error due to the failure or fault of the one exposure detection pixel may be prevented. Furthermore, since the radiation is irradiated on almost all pixels of the radiation detecting unit at the time of exposure to radiation of the radiation detecting unit, the radiation may be irradiated on two or more exposure detection pixels at all times. Accordingly, when the radiation is detected from two or more exposure detection pixels, it does not cause any problem to determine the exposure to radiation of the radiation detecting unit.

An operation for correcting the charge amount data of the exposure detection pixel may be further included. After whether the radiation detecting unit is exposed to radiation is determined by reading out the charges from the exposure detection pixel at a predetermined interval, when the exposure to radiation of the radiation detecting unit is determined, a radiographic image is instantly generated. In this case, the charge amount data corresponding to the exposure detection pixel is lost and quality of the radiographic image may be degraded. Accordingly, when the charge amount data of the exposure detection pixel is corrected, the degradation in quality of the radiographic image may be prevented.

In the operation for correcting the charge amount data, the charge amount data of pixels adjacent to the exposure detection pixel may be interpolated to correct the charge amount data of the exposure detection pixel. Since the exposure detection pixel in the radiation detecting unit occupies a very small portion compared to the entire plurality of pixels, loss of the charge amount data corresponding to the exposure detection pixel does not cause a large problem. However, since a large problem may occur in a radiographic image in a case where the exposure detection pixel is positioned in the central portion of the radiation detecting unit and charge amount data in an important position is lost, the charge amount data of pixels adjacent to the exposure detection pixel may be interpolated to correct the charge amount data of the exposure detection pixel. In this case, since a median value of the charge amount data of the pixels adjacent to the exposure detection pixel replaces the charge data of the exposure detection pixel, the charge amount data of the exposure detection pixel may be made approximate to original data of the lost charge amount data corresponding to the exposure detection pixel. Accordingly, the quality of the radiographic image may be improved, and accurate diagnosis by the radiographic image may be enabled.

The exposure time may be longer than a period in which operations (e) and (f) are performed again (or repetitively). When the exposure tine is equal to or shorter than the period in which operations (e) and (f) are performed again, the charge amount data may not be sufficiently obtained from the plurality of pixels of the radiation detecting unit. If the exposure time and the period in which operations (e) and (f) are performed again are the same, when the exposure to radiation of the radiation detecting unit is determined, since a maximum value of a time error becomes the exposure time, the subject is exposed to the radiation for double the optimal exposure time and the radiation exposure dose of the subject may increase. If the exposure time is smaller than the period in which operations (e) and (f) are performed again, when the exposure to radiation of the radiation detecting unit is determined, since the maximum value of a time error is longer than the exposure time, the subject is exposed to the radiation for a longer period of time than double the optimal exposure time and the radiation exposure dose of the subject may further increase. Furthermore, the exposure time may be set to 500 ms or 1 s, etc. according to the subject.

Like this, the radiation detector 100 according to an embodiment of the present invention may simply perform an AED function by configuring, as an internal logic, an AED module in an IC (e.g. FPGA), which is necessarily used for controlling the gate module and the readout module, without a separate complicated device for detecting an incident radiation and detecting the exposure to radiation. In addition, the AED function may be performed with only one exposure detection pixel selected from among a plurality of pixels of a radiation detecting unit. Accordingly, an AED speed may become rapid, and a charge amount lost in an AED process may also be reduced. Furthermore, since the radiation detector of the present invention does not reset the radiation detecting unit after the radiation exposure detection, but uses the irradiated radiation in succession during a designated radiation exposure time period without any particular process, the irradiated radiation may be effectively used and the radiography time may be reduced. In addition, since a subject is exposed to a radiation only for a set exposure time period due to an effective use of radiation, an exposure radiation dose of the subject may be minimized. In addition, since the AED module is not a separate device including a separate optical detection member or a radiation detection member, a detection error due to vibration, which occurs by a rub or contact, may be reduced. In addition, since the reference charge amount value is set only at the time of first radiography, rapid re-radiography may be performed.

Although the radiation detector and the radiography method using the same have been described with reference to the specific embodiments, they are not limited thereto. Therefore, it will be readily understood by those skilled in the art that various modifications and changes can be made thereto without departing from the spirit and scope of the present invention defined by the appended claims and their equivalents.

What is claimed is:

1. A radiography method using a radiation detector comprising a radiation detecting unit comprising a plurality of pixels arrayed in a matrix, wherein each pixel of the plurality of pixels is connected to a gate line of a plurality of gate lines, is connected to a data line of a plurality of data lines, and stores charges proportional to irradiation dose of radiation, the radiography method comprising:
   (a) selecting at least one of the plurality of gate lines;
   (b) selecting at least one of the plurality of data lines;
   (c) reading out charges stored in at least one exposure detection pixel, and the plurality of pixels includes the at least one exposure detection pixel;
   (d) setting a reference charge amount value by using a first charge amount of the charges read out from the at least one exposure detection pixel;
   (e) removing charges stored in the plurality of pixels of the radiation detecting unit;
   (f) selecting again the at least one of the plurality of gate lines and the at least one of the plurality of the data lines to detect exposure to radiation, and
   determining whether or not the radiation detecting unit is exposed to radiation by comparing a second charge amount read out from the at least one exposure detection pixel with the reference charge amount value,
   wherein, if it is determined that the radiation detecting unit is exposed to radiation, then the radiography method further comprises maintaining radiation exposure of the radiation detecting unit during a predetermined exposure time in order to store further charges to all the plurality of pixels, and then reading out charges stored in all the plurality of pixels for generating a radiographic image, by scanning all the plurality of pixels after the predetermined exposure time;

wherein, if it is determined that the radiation detecting unit is not exposed to radiation, then the radiography method further comprises generating a reset request signal for removing charges stored in the plurality of pixels of the radiation detecting unit;

wherein the radiography method further comprises correcting charge amount data of the at least one exposure detection pixel generated by charges read out from the at least one exposure detection pixel among the charges read out in all the plurality of pixels, wherein determining whether or not the radiation detecting unit is exposed to radiation comprises reading out charges stored in the at least one exposure detection pixel, and is repetitively performed until before the exposure to radiation of the radiation detecting unit is determined, and wherein, in correcting the charge amount data, a median value of charge amount data of pixels adjacent to the at least one exposure detection pixel is determined, and the charge amount data of the at least one exposure detection pixel is replaced with the median value to correct the charge amount data of the at least one exposure detection pixel.

2. The radiography method of claim 1, further comprising:
setting the predetermined exposure time for which the radiation exposure of the radiation detecting unit is maintained.

3. The radiography method of claim 1,
wherein the radiation detecting unit is determined to have not been exposed to radiation when the charge amount being read out from the exposure detection pixel is smaller than the reference charge amount value, and
operations (e) and (f) are re-performed after determining that the radiation detecting unit is not exposed to radiation.

4. The radiography method of claim 3,
wherein the predetermined exposure time is longer than a period in which operations (e) and (f) are re-performed.

5. The radiography method of claim 1,
wherein the radiation detecting unit is determined to have been exposed to radiation when the second charge amount is equal to or greater than the reference charge amount value.

6. The radiography method of claim 1,
wherein, operations (e) and (f) are re-performed after determining that the radiation detecting unit is not exposed to radiation.

* * * * *